(No Model.) 2 Sheets—Sheet 1.
A. HEINEMANN.
HERMETICALLY CLOSING JUG.
No. 572,257. Patented Dec. 1, 1896.
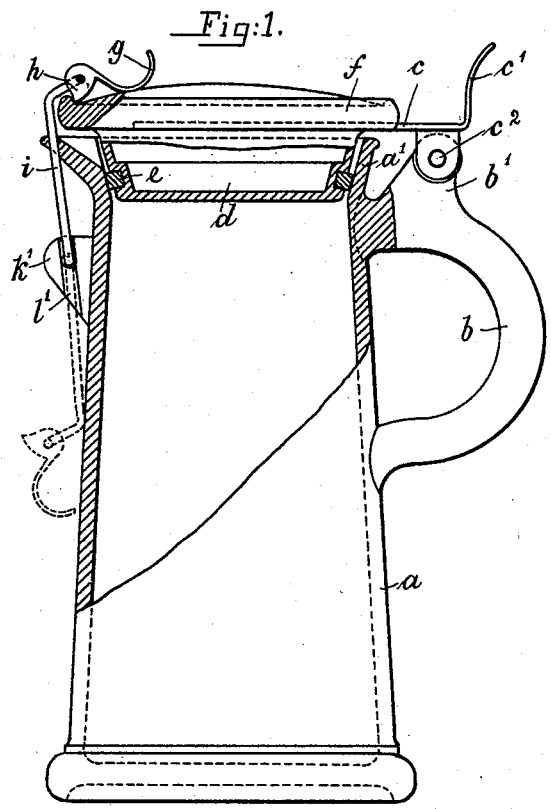
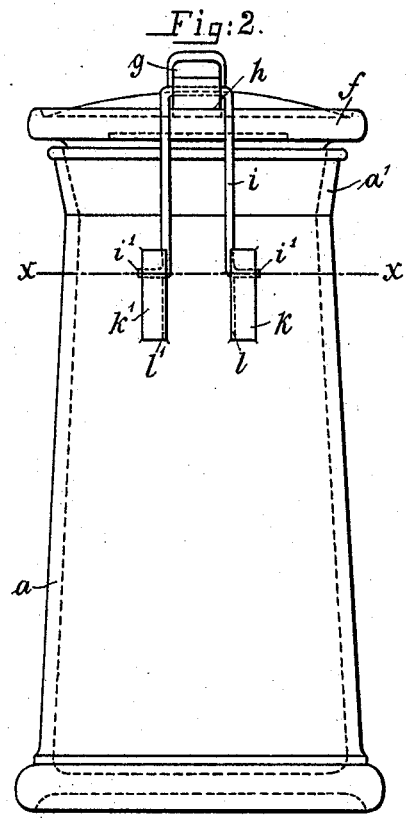
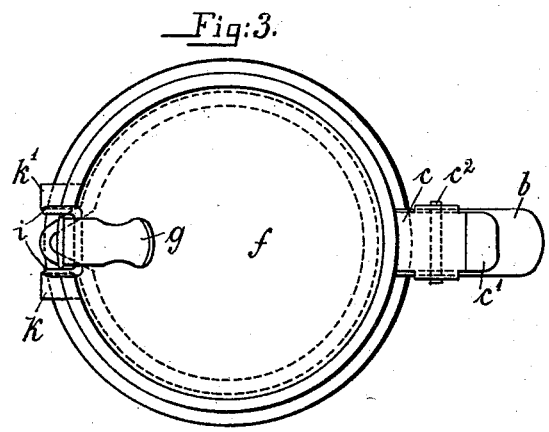
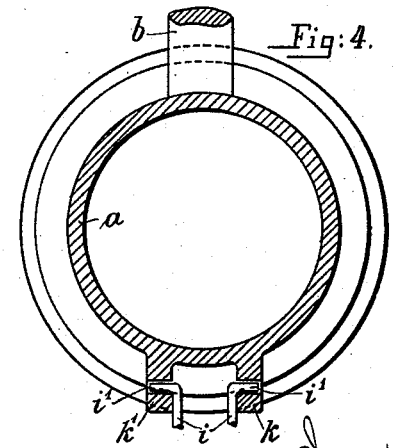
Witnesses
H. van Oldenneel
E. A. Scott
Inventor
Albert Heinemann
by Richardson
Attorneys (No Model.) 2 Sheets—Sheet 2.

A. HEINEMANN.
HERMETICALLY CLOSING JUG.

No. 572,257. Patented Dec. 1, 1896.

Witnesses
H. van Oldenneel
E. A. Scott

Inventor
Albert Heinemann
by Richards
Attorneys

UNITED STATES PATENT OFFICE.

ALBERT HEINEMANN, OF BERLIN, GERMANY.

HERMETICALLY-CLOSING JUG.

SPECIFICATION forming part of Letters Patent No. 572,257, dated December 1, 1896.

Application filed April 30, 1896. Serial No. 589,745. (No model.) Patented in England March 18, 1895, No. 5,655.

*To all whom it may concern:*

Be it known that I, ALBERT HEINEMANN, merchant, a subject of the Emperor of Germany, and a resident of 127 Friedrichstrasse, Berlin, in the Empire of Germany, have invented new and useful Hermetically-Closing Jugs or Like Receptacles, of which the following is a full, clear, and exact description.

This invention has been patented in Great Britain under No. 5,655, of March 18, 1895.

This invention relates to a jug, pitcher, or like receptacle having a slightly conical neck and a correspondingly-shaped lid, such lid being tightly closed by means of a suitable locking device, which can be readily opened or closed by a suitably-shaped lever. A packing-ring of india-rubber or other suitable material is placed on the lid in such manner that it is tightly pressed against the conical neck of the receptacle when the lid is closed. This receptacle is particularly adapted for gaseous liquids, such as beer, as also for preserves, seeing that the packing-ring prevents any gases escaping, and also prevents atmospheric air gaining access to the contents of the receptacle.

Figure 5:
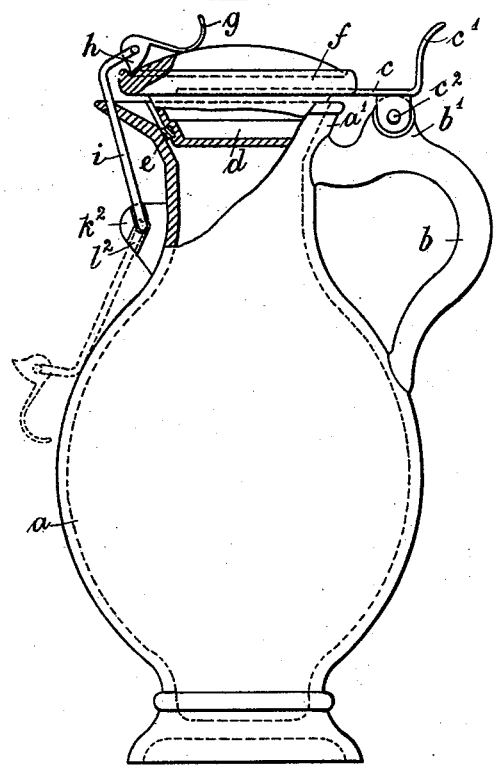
Figure 6:
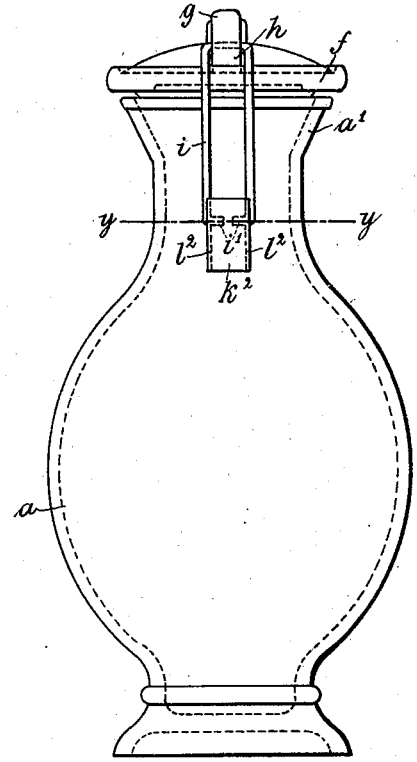
Figure 7:
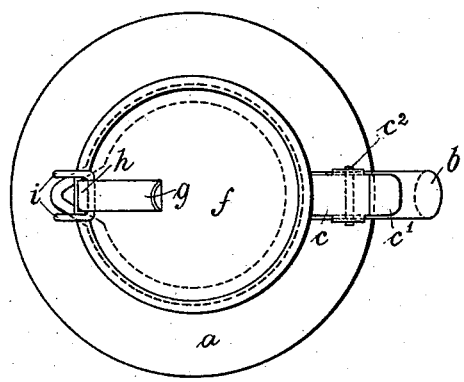
Figure 8:
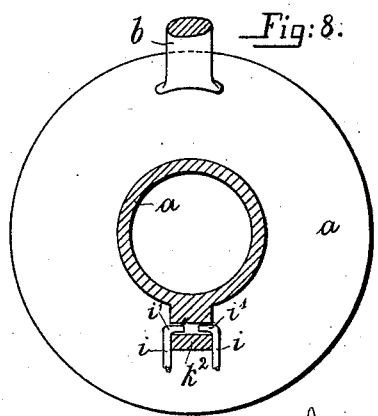

Referring to the accompanying drawings, Figure 1 is a side view, in part section, of a jug. Fig. 2 is a front elevation, and Fig. 3 a plan, of same. Fig. 4 is a horizontal section on line $x\,x$ of Fig. 2. Fig. 5 is a side view, in part section, of a modified construction of jug. Fig. 6 is a front elevation, and Fig. 7 a plan, of same. Fig. 8 shows a horizontal section on line $y\,y$ of Fig. 6.

The jug or pitcher $a$ has a slightly conical neck $a'$, the front of which neck forms a spout, while the handle $b$ has an extension $b'$, in which latter the plate $c$ turns on the pivot $c^2$, the end $c'$ of plate $c$ serving as thumb-piece or handle for opening and closing the lid $d$. The latter, which is preferably hollow, tapers, so as to fit snugly into the conical neck $a'$ of the jug. The periphery of the lid $d$ is provided with a groove for receiving a packing-ring $e$, of india-rubber or other suitable material, such ring being preferably square in section in order that its whole surface bears against the lid and thus better closes the jug. The top of the lid has a groove in front or all around same for receiving the nose $h$ of locking-lever $g$ when the lid is closed. The lever $g$ turns in the locking-bow $h$, and on being tilted so as to engage with the lid $d$ securely closes the latter. On releasing the lever $g$ the bow $h$ takes up the position shown by dotted lines in Figs. 1 and 5, and the lid can be opened.

As shown in Figs. 1 to 4, the locking-bow $i$ is secured in two lugs $k\,k$, preferably integral with the jug, by its two outwardly-directed ends $i'$ being inserted in corresponding holes of such lugs. On each of the inner sides of the lugs $k\,k'$ is a groove $l\,l'$, the object of which is to secure the flexible arms of the bow $i$ both in the upper or locked and in the lower or open position. In the one case the lever $g$ need only be turned so as to engage with the groove in the lid, whereas when in the lower position the bow $i$ is held in the grooves and is thus not in the way, for instance, when pouring out the liquid or the like in the jug.

Figs. 5 to 8 show the wire bow $i$ secured by a single lug $k^2$, the ends $i'$ being directed inwardly to enter a hole in such lug. The latter is provided with grooves $l^2$ on its outer sides, such grooves being made angular in order that the bow $i$ may be securely held both in the upper and lower position in accordance with the form of the jug.

Having now particularly described and ascertained the nature of this invention, I declare that what I claim, and wish to secure by Letters Patent, is—

1. In combination, the jug, the cover and a closing-bow having spring-arms with laterally-bent ends, said jug having bearing-openings for the said bent ends with grooves adjacent to the said openings for engaging the closing-bow for holding the same in either its upper or lower position, substantially as described.

2. In combination, the jug, the conical cover with its packing, and having a groove in its top, the locking-lever and the closing-bow consisting of the bow-shaped spring-wire, the free ends of the bow being sprung into bearings on the jug and the said locking-lever being pivoted on the cross-bar of the bow, substantially as described.

In testimony whereof I have hereunto signed my name in the presence of two subscribing witnesses.

ALBERT HEINEMANN.

Witnesses:
F. KOLHN,
W. HAUPT.